(12) United States Patent
Yacoub

(10) Patent No.: US 6,452,692 B1
(45) Date of Patent: Sep. 17, 2002

(54) NETWORKED PRINTER SERVER

(75) Inventor: Yousef R. Yacoub, San Jose, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 09/636,082

(22) Filed: Aug. 9, 2000

Related U.S. Application Data

(63) Continuation of application No. 08/759,300, filed on Dec. 2, 1996.

(51) Int. Cl.[7] .............................................. G06K 15/00
(52) U.S. Cl. ..................................... 358/1.15; 358/1.13
(58) Field of Search .............................. 358/1.15, 1.13, 358/1.14, 1.16, 1.1, 468, 407

(56) References Cited

U.S. PATENT DOCUMENTS 5,220,674 A * 6/1993 Morgan et al. ............. 358/1.11
5,467,434 A * 11/1995 Hower, Jr. et al. ......... 358/1.15

OTHER PUBLICATIONS

Jackson et al; "Methodology for Automated Printed Selection" IBM Technical Disclosure Bulletin vol. 36 No. 09B; p. 379 Sep. 1993.*

* cited by examiner

Primary Examiner—Gabriel Garcia
(74) Attorney, Agent, or Firm—Blakely Sokoloff Taylor & Zafman

(57) ABSTRACT

A print server for print jobs printed on networked printers. First, the print server receives preferences regarding a print job the user wishes to send such as speed and image quality. Next, the server determines, using a database or other query, the most appropriate printer complying with the print job preferences that is located physically near the user and spools the print job to that printer. If the printer returns an error signal, the server will determine a different printer which closely complies with the print job preferences and re-send the print job. If a busy signal is returned, the user will be given the choice of waiting or having the server automatically determine the next available appropriate printer. When the print job is complete, the user will be notified of the physical location of the printer where the print job was processed.

25 Claims, 6 Drawing Sheets

NETWORKED PRINTER SERVER

This application is a continuation of application Ser. No. 08/759,300 filed Dec. 2, 1996.

BACKGROUND OF THE INVENTION

1. Field of the Invention

The present invention relates to the field of computer peripherals. More specifically, the present invention relates to print servers.

2. Description of Related Art

Two types of printers—stand-alone and networked—are currently available for computer systems and other devices generating hard copy output. A stand-alone printer is connected directly to a port of the computer system for which it is utilized and is often located physically near the computer system. A stand-alone printer, though easy to monitor and control due to its proximity and direct connectivity to the computer system, cannot be shared. Historically, with a computer such as a mainframe or server, there has always been one printer or a single set of printers, so-called networked printers, somewhat remotely located from individual client workstations which were shared by multiple clients connected to that mainframe or server. More recently, as local area networks (LANs) and wide area networks (WANs) of many individual client workstations gained popularity, the networking of a single printer or set of printers for these workstations using a central server also became popular.

In a server environment, networked printers are connected to client workstations through a central server. Most servers also allow users on computers systems (clients) to access shared data, run shared applications and manage network communications among clients. When desired, specialized servers, such as print servers, can be employed to carry out only one function. Traditional print servers manage print jobs when generated by clients of the network by keeping a task list of all print jobs on the network, listing the sizes of those jobs and priorities. In cases where there is no print server, the individual workstations can perform the print server functions, but do so with only limited effectiveness.

Even with a traditional print server in the network, the user at each client station must select the printer that they wish to use, or they can be assigned a default printer during setup of the client station. In any case, the user is forced to choose (or leave to default) the printer used when sending a print job over the network. The user must also select all the preferences of the print job, such as print image quality, speed, color or black-and-white, etc., before the job is sent.

If the print job is successful, the user can go to the printer and pick up the print job. However, if there is an error, or the printer is busy processing a job from a second user, the user will be notified by either the server or the selected printer. Typical printer errors such as "printer out of paper" are sent to the user at the user's client station to notify the user that the error should be resolved if printing is to be completed. At this stage, the user must either fix the printer error (for instance, adding paper in case of a "printer out of paper" error) or cancel and resend the current job to a different printer. If the user chooses to resend the job to a different printer, the user must select which printer and, thus, be aware that the printer selected is capable of complying with the preferences of the print job.

Currently, there is no networked print server solution allowing a user to merely select the preferences of the print job, such as quality and speed, without also having to determine which printer on the network will best suit his needs. Further, traditional networked print servers do not automatically re-route jobs to other printers when there is a printer error, nor keep track of and account for the physical location of printers when re-routing them, such that the printer selected will be close in proximity to the user/client. When the user is forced to select a printer on the network, he must know where that printer is and make decisions as to the printer's capabilities in order to ensure compliance with the print job preferences. Another feature lacking in traditional print servers is the ability to automatically distribute and update new software and drivers for existing printers, or provide drivers/software for new printers, thereby eliminating the need to manually update each of the client stations in such cases.

Thus, there is a need for a networked print server solution where the user needs only choose job-relevant preferences such as the quality and speed without having to determine which printer to send the print job to. Further, when a printer error occurs, there is a need to automatically ensure that the job is printed in compliance with the print job preferences without the user having to manually select a different printer.

SUMMARY

The invention provides a method and apparatus for a networked print server which minimizes the necessity of user interaction in the printing process.

A virtual printer, coupled to a client station and generating a print job, receives preferences from a user regarding the print job such as image quality and/or speed. The virtual printer sends the print job along with the preferences over a network to a server. The server automatically determines which printer of the printers on the network comply with the print job preferences. The server then selects an appropriate printer which complies with the preferences of the print job and is located physically near the user/client. When the job is complete, the server notifies the user through the virtual printer that the print job is complete and of the location of the selected printer. If an error signal is returned by the selected printer before completion, the server automatically selects a different printer closely complying with the preferences.

Alternatively, the server may only store a database necessary for the virtual printer to determine and select an appropriate printer. The server may also be capable of spooling the print job from the client. The server may also store and update the physical locations of printers and client workstations as well as maintain the availability/status of printers on the network. The server will also be able to update software/drivers for existing or new printers by distributing the necessary code to the clients automatically.

DETAILED DESCRIPTION OF THE INVENTION

Figure 1:
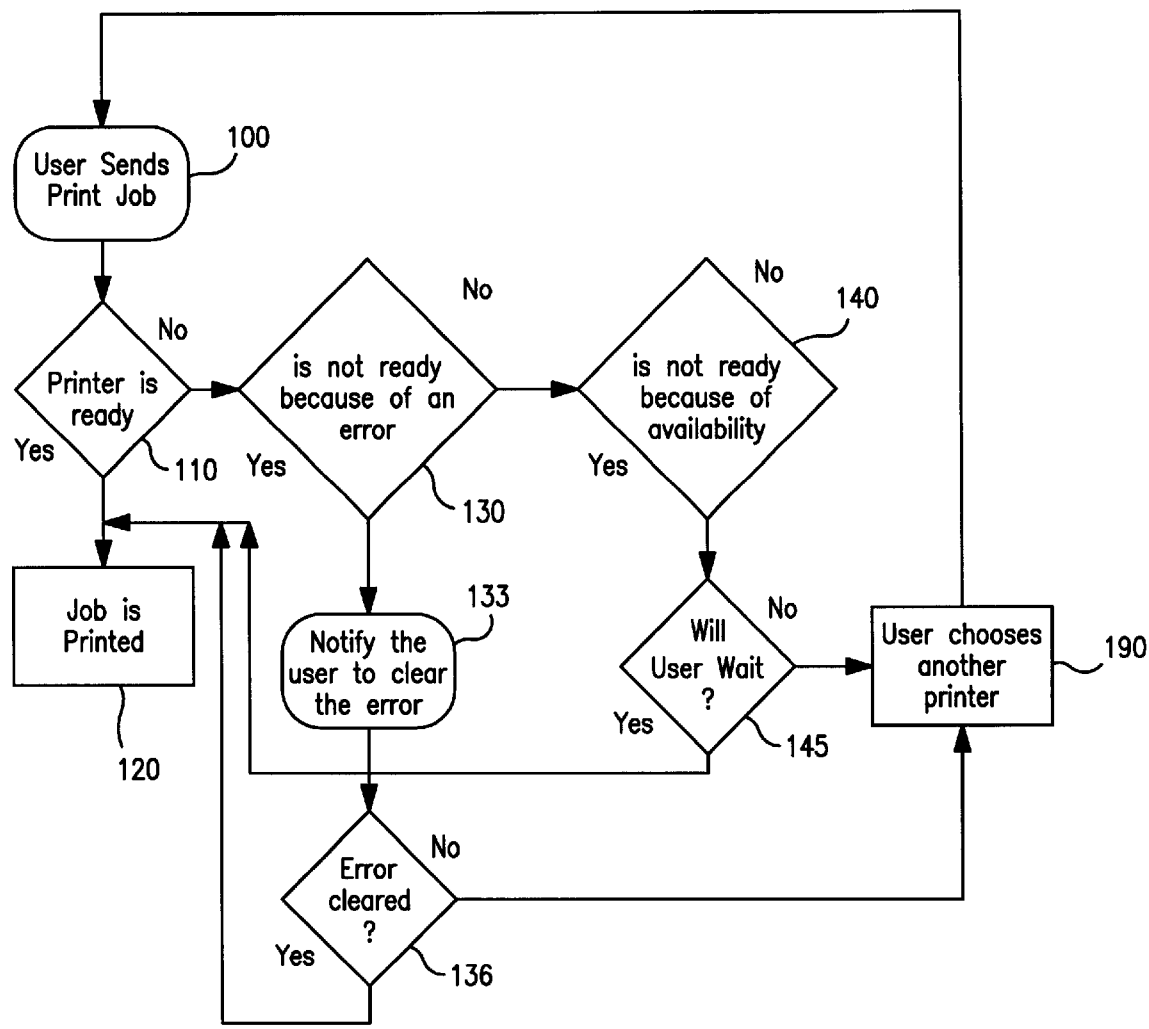
FIG. 1 is a flowchart of a print job on a traditional networked printer.

FIG. 1 is a flowchart of a print job managed on a traditional networked print server according to the prior art.

In FIG. 1, according to step 100, a user at a client station sends a print job to a printer which has been already chosen by the user or has been pre-selected by a default setting. Also at step 100, the user has selected the preferences of the job such as the quality and/or speed of the print job. In a traditional print server, the server or operating system of the user's computer station from which the print job is generated checks whether the printer is ready for the print job to be processed (step 110). If the printer is ready (has paper, is on-line, etc.), then the job is printed (step 120).

However, if the printer is not ready, then two possibilities arise: 1) the printer is not ready because of an error (checked at step 130) or 2) the printer is not ready because of availability (checked at step 140). If the printer is not ready because of an error, then the server/printer notifies the user to clear the error (step 133) by the use of a text/graphics message on the display of the client, or an audio message output through speakers on the client. Next, the server and/or software checks to see if the printer error has been cleared (step 136). If the error is cleared, then the job is printed (step 120). If the error is not cleared, then the user must choose another printer (step 190), at which point the client/server sending procedure begins anew (step 100), but using a different printer chosen by the user.

If the printer is not ready because of availability (checked at step 140), this indicates that another print job is on-going from the same or another client of the network. In this case, the user is asked if he wants to wait (step 145). If the user decides to wait, then once all pending print jobs with a higher priority are completed by that printer, then and only then is the print job of this user finally printed (step 120). However, if the user decides not to wait, he must choose another printer (step 190), at which point the process of the user sending the print job begins anew (step 100), but with a new printer which must be chosen by the user. In cases of busy printers, the user is forced to wait until the job is printed or must cancel the job and reset the choice of printer through software such as a "chooser", which is a network device manager which can change the printer to which the client station prints.

The disadvantages of the traditional networked printer/server, illustrated in FIG. 1, are many. The burdens on the user, whose only concern is that the job be printed and preferably in a closely located printer with a certain quality, are great. The user is forced to select a printer, and if that choice has been made by default, then upon an error, the user must either clear the error himself, which requires the user going to the location of the printer and fixing the error, or select yet another printer. The inefficiency of traditional print servers is substantial with respect to what the user is forced to know/do ensure that the job is printed successfully. When selecting another printer, the user must know which available printers are capable of successfully processing his print job (for example, if the user needs a color print job, a black-and-white only printer is inadequate). Further, the user may unwittingly select a printer which is in a physical location distant from his station, though closer printers were available and capable of successfully processing the job. If a selected printer is not available, then the user must wait for the selected printer to become available even though another printer, unknown to the user, was available, at that time. Thus, the user may be made to wait unnecessarily.

Further, on a client or shell which operates from a mainframe, the user must know which printers are available, and how they are accessed (device parameters) if the user is to successfully choose another printer. In many platforms, such as UNIX, no error message from the printer may ever be returned to the user indicating that the job failed or that the printer is busy. For instance, when the user submits the "lpr" (line printer) command in a UNIX shell to print a document, the job may be sent but never successfully completed, and the user would have no way of knowing if the job was successful, or if the printer was ready, unless the user goes to the printer location and checks.

Therefore, there is need to reduce the level of user interaction in sending a print job, such that, when a job is sent, a print server can automatically select an appropriate printer based on its location, capability and availability. Further, when a printer has an error, the user should not be required to fix the error or manually select another printer but rather, it should be the job of the server to automatically select another printer. Finally, when client stations need software/driver updates and installs, the print server should be equipped to automatically distribute and install such drivers/software as appropriate.

Figure 2:
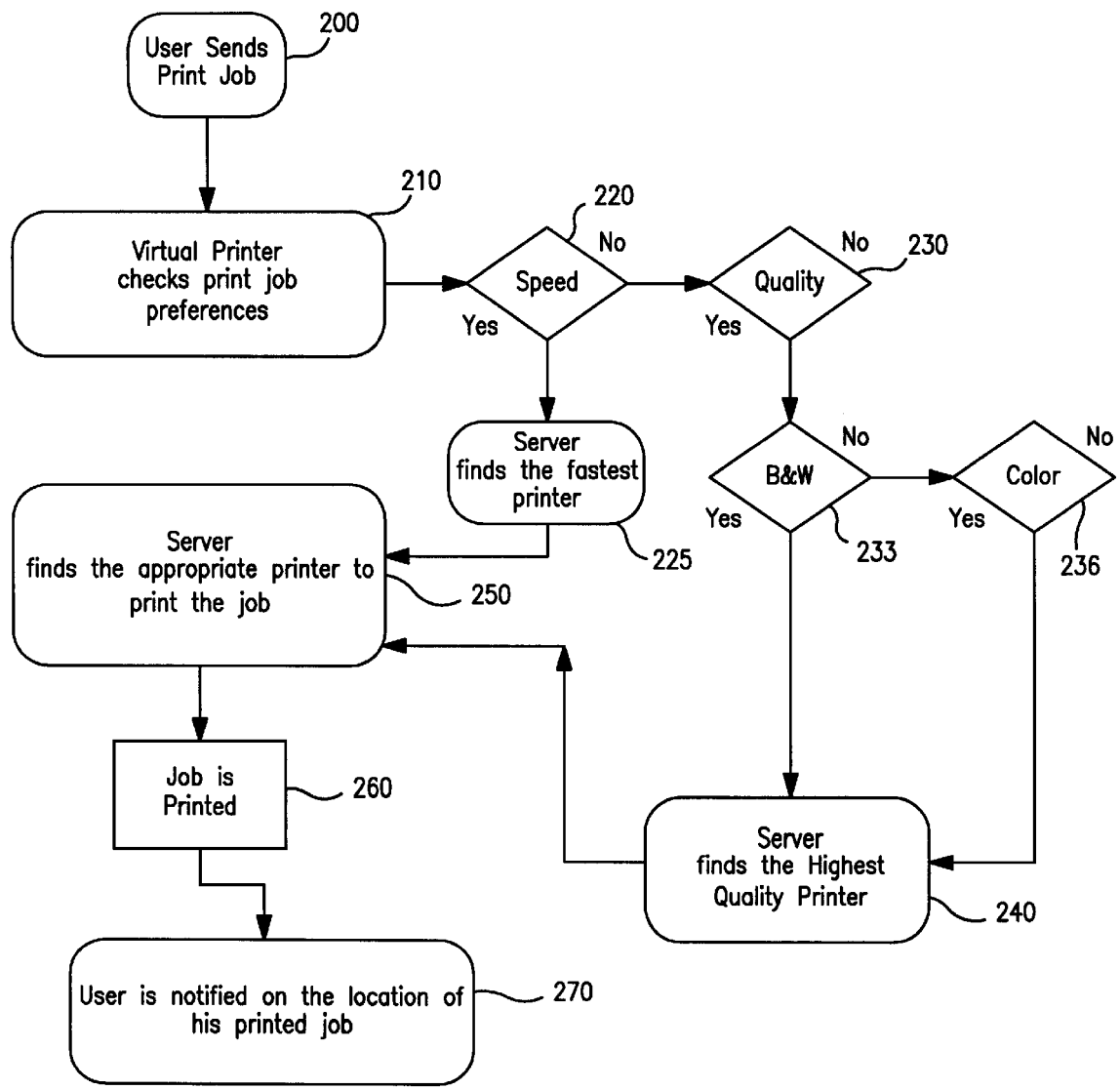
FIG. 2 is a flowchart of a print job managed on a printer server according to one embodiment of the present invention.

FIG. 2 is a flowchart of a print job managed on a printer server according to one embodiment of the invention.

In sharp contrast to the methodology shown in FIG. 1, the user is relieved of most, if not all, of the interaction with the printing process once the job is sent to a print server operating as illustrated in FIG. 2.

According to step 200, the user sends a print job to a printer which has already been chosen by a default setting or in the absence of a default, to a "virtual" printer which, on the client, acts as a gateway for client to server communication regarding printing. The virtual printer can be implemented as a stand-alone application or function call running from the software that generates the print job or even an extension or add-in to the operating system of the computer generating the print job. Such virtual printer devices are well known in the art of printing technology.

At step 200, the user has selected the preferences of the job such as the quality of the print job, the speed and whether the image should be in black-and-white or in color. Though speed and quality are inversely related, with a higher quality leading to lower speed and a lower quality leading to a higher speed, the preferences can be treated as separate. The speed preference of the print job refers not to the user's choice of the number of pages-per-minute precisely, but rather whether the job should be rushed or can be delayed to guarantee that the print job preferences are better complied with. If a high quality image, with quality defined by the dots-per-inch (dpi) of the print image, is more important, then speed may be sacrificed. The print job preferences, namely, quality, speed, color, are only exemplary of three of the many preferences possible for a print job such as paper type, paper size, dithering, and so on.

For the preferences shown in FIG. 2, the networked print server, according to one embodiment of the invention operates as follows. When the print job is being sent, the virtual printer, which is a software extension of the client, checks the preferences of the print job (step 210). If speed is a preference of the user (checked at step 220), then the server will find out which printer out of all available printers is the fastest (step 225). Availability may be defined either with regard to a printer being busy or merely that the printer will be "ready" (no errors) to print, busy or not.

If speed is not a preference of the user (checked at step 220), then the server will automatically default to knowing that quality is a preference of the user (checked at step 230). Once quality of print image is determined to be a preference of the user, then the next preference to be chosen is whether or not the print image should be in black-and-white or in color. If the print image is to be in black-and-white (checked at step 233) then, according to step 240, the server will find out which printer out of all available printers is the highest quality printer that prints in black-and-white. However, if the user prefers a color image that is of high quality (checked at step 236, but defaults to yes) then, at step 240, the server will find out which printer out of all available printers is the highest quality printer that can print in color.

Whatever the print job preferences selected by the user, at step 250, the server automatically determines and selects the appropriate printer to print the job. The appropriate printer may be the printer that is physically located nearest to the user (client station) and may also be, of the available printers, the printer which is not busy or the least busy. At step 250, if the highest quality printer (determined at step 240), or the fastest printer (determined at step 220), are currently busy, then the server will determine which printer is the next highest quality printer or the next fastest printer that is not busy.

Likewise, in the case of a printer error, if either the highest quality printer or the fastest printer returns some error code, such as "out of paper", then, according to step 250, the server will find an available printer which is not busy and which does not return any error messages. Thus, the user is relieved of the burdens of trying to determine and select the most appropriate printer for his job. The user has already selected the speed and quality at which the print job is preferably printed and there the burden ends once the appropriate printer is found to print the job, the job is printed (step 260). Preferences can be set either by default or through a changing dialog box or menu, after which the user needs only to wait for the notification of where his print job was printed to. According to step 270, the user is notified of the location of the printed job.

In the embodiment illustrated in FIG. 2, speed and quality have yes or no values. However, it will be readily appreciated by one skilled in the art that the speed can be variable and have many values from which the user can choose, such as slow, slower, fast, fastest or medium. Likewise, the preference of quality as shown in FIG. 2 can have many different values from which the user can choose such as letter or draft mode or even specifying, from a range of dpi, an exact dpi quality of his print image. Whatever the range and type of preferences, the most appropriate printer for the speed and quality settings, or even a combination of the two, can be determined by slightly modifying the server and, thus, does not need to be selected by the user.

Thus, if a fast job is preferred and a color job is also preferred, then only certain printers, which are both fast and can print in color, will be determined as among the appropriate printers to print the job. When finding the most appropriate printer to print a job, the physical location of the printer in relation to user is not available in traditional print servers. This feature of the server ensures that the user will travel the shortest possible distance in order to pick up his print job once it is printed.

The print server will have software/hardware/firmware capable of performing the computation necessary to determine which printer is the "appropriate" printer. The server software can, in one embodiment, query a database containing printer capability information for all printers present in, for example, an office suite where the user works. Typical information includes device parameters such as the printer's speed, its color/grayscale/black-and-white capability, the types of paper it will accept and so on, and can be obtained from driver software supplied by the manufacturers of the printers or by a system administrator who knows the capabilities of the printer. The database of printer capability may be statically or dynamically stored on the server depending on the circumstances of the network in which it is employed. When finding the highest quality printer according to step 240 and/or the fastest printer according to step 225, the server operates as follows.

The server reads printer capability information from the database of printer information and uses a sorting or indexing method to rank in a list the printers according to speed and/or quality, whichever is required. The topmost rank of printer using some identifier is passed to a function call or software of the server determining the "appropriate" printer at step 250. By traversing through the list, starting with the topmost ranked printer, the server will query each printer for availability.

In another embodiment, the server will access a coordinate mapped list of the physical locations of each printer. Assuming a single (2 dimensional) plane, the topmost ranked printer according to speed and quality will be indexed by its identifier and returned its coordinate $(X_1, Y_1)$. The user or workstation generating the print job can also be identified by a coordinate location by accessing a similar coordinate map list for workstations, and when indexed against the list returns a client coordinate $(X_2, Y_2)$. Again, assuming a single plane, the distance between the topmost ranked printer and the user/workstation is determined by server/virtual printer computing the formula $\sqrt{(X_2-X_1)^2+(Y_2-Y_1)^2}$. If the second ranked printer is determined by the server to be equally or closely capable with the topmost ranked printer, then the distance of the second ranked printer (coordinate $(X_3, Y_3)$) is determined according to the formula $\sqrt{(X_3-X_2)^2+(Y_3-Y_2)^2}$. This distance is compared with the distance from the user to the topmost ranked printer to determine which of the two printers is most "appropriate" printer complying with the user's speed/quality preferences and is also closer than other printers of similar capability. These formulas and coordinates can be readily extended to multiple floors (3 dimensions) by one skilled in the art.

Each user or workstation may have a profile stored in the server which enables the server to decide how important distance is compared to speed/quality preferences. The case logic and artificial intelligence involved in determining which printer is most appropriate involves ranking speed/quality and other job-related preferences with physical location (distance from the user), and can be implemented in a variety of software methods and algorithms. A programmer/designer skilled in the art will readily be able to optimize the specific logic, algorithms and artificial intelligence to suit both the usage constraints of the network (how many total printers, total users, etc.) and the computing power/speed of the server. For instance, a list may be generated in advance for each combination of speed/quality and stored for immediate access whenever the server requests it rather than computing at every instance which printer complies with the preferences. Furthermore, all the lists and databases employed in determining the most appropriate printer may be dynamically updated or static until manually modified.

If an appropriate printer for each print job is busy or has an error, the query of indexing and determining an appropriate printer will repeat with the busy or error-producing printer eliminated from the computation or list. The busy/error/available status of each printer can also be queried by the server periodically and stored in a list as is required. Further, the error status such as out-of-paper can be forwarded to an administrator or other personnel responsible for clearing the printing error. In determining the location of printers in relation to client stations, the network port or address may be used as a basis for determining the coordinate locations thereof.

Figure 3:
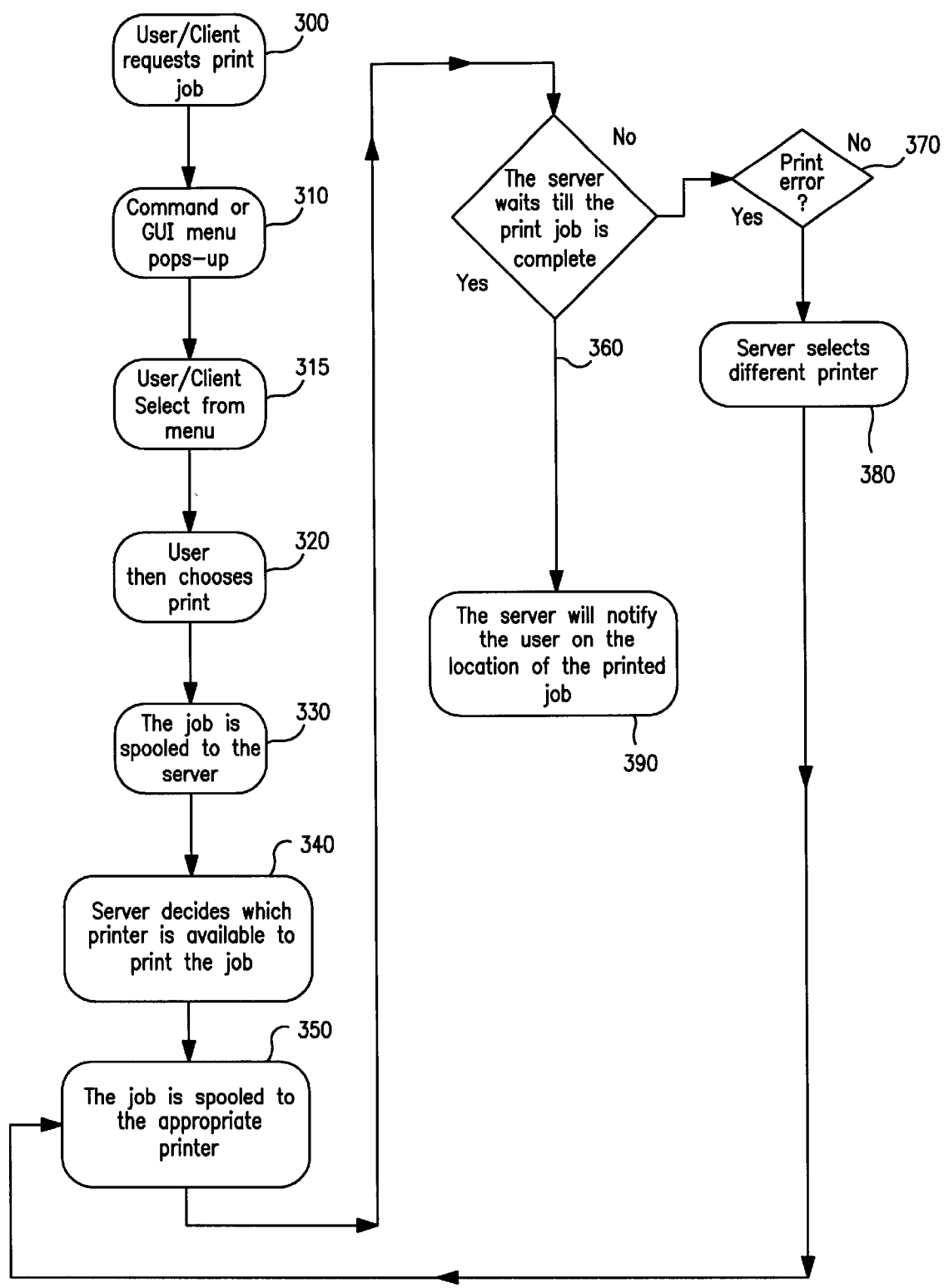
FIG. 3 is a flowchart of a print job on a network printer as submitted to a server according to an embodiment of the present invention.

FIG. 3 is a flow chart of a print job on a network printer as submitted to a server according to one embodiment of the invention.

First, according to step 300, the user/client requests a print job. The print job may be generated by software or an application within the client workstation of the user who selects a print command from the application. According to step 310, a command or graphical user interface (GUI) menu will pop-up on the client station's display screen to allow the user to select the preferences of the print job such as speed, quality and either color or black-and-white. Once the user has completed selecting all of the preferences of his print job from the menu at step 315, the user may then choose to print the job (step 320). Next, according to step 330, the print job is spooled to the server. The server will be capable of containing many such print jobs from different users and clients on the network.

Once a job is spooled to the server, the server will decide which printer is available to print the job (step 340) using the print job preferences selected from the GUI or command menu. The print job preferences are also sent along with the actual print job when spooled to the server. The server will have a map of all available printers along with the status of each printer, such as busy or paper out which can be updated in a timely manner. The server may also have a mapping of the physical location (coordinate map) of each of the printers on the network and each of the client workstations such that when the server decides which printer is available to print the job, the server can compute the distances from printers to client stations and find the printer nearest to the user which also complies with print job preferences. Once the appropriate printer is determined, the print job is sent and spooled to that printer (step 350) from the server.

Since the job has already been spooled to the server at step 330, the client station is free to perform other tasks and does not have the ongoing print job clogging up or bottling up the computer system at his workstation. According to step 360, the server waits until the print job is completed by constantly checking to see whether or not the print job has been completed. This typically involves checking for a control signal from the printer specifying that the print job sent has already been printed. According to step 370, the server is also checking continuously for a print error message back from the printer. If a print error message is returned, then the server selects as the appropriate printer (step 380) a different printer from the printers that are available. When the server selects a different printer, the server reuses the same preferences that the user or client selected initially for that print job.

The preferences can be stored in a user profile or even a print job profile for each individual print job. With a user profile, the server is capable, for each user or client on the network, of storing a default profile of what preferences for print jobs the user or client is most likely to request and how important location of print job is to the user. In step 380, it is the server, and not the user, that must select a different printer when a print error is returned, after which the job is spooled to the selected printer. Once the print job is complete, according to step 390, the server will notify the user of the location of the printed job through the virtual printer on the client workstation so that the user can pick up the printed job.

Figure 4:
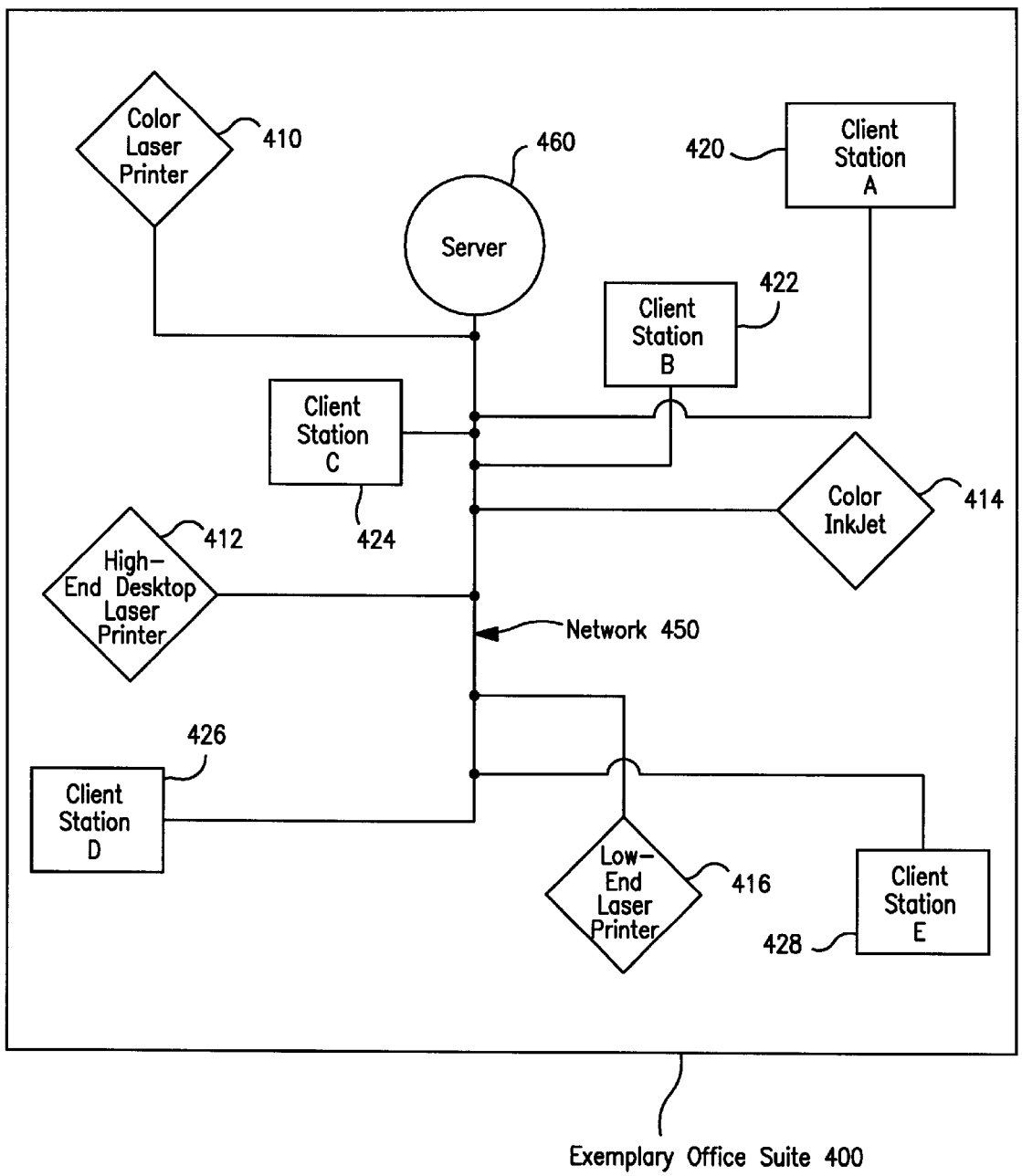
FIG. 4 is a diagram of an exemplary office suite with multiple client stations and printers.

FIG. 4 is a diagram of a typical office suite having four printers and a multitude of user client stations.

A network 450, which can be a LAN, WAN or other private network or even the Internet, connects together a server 460 along with five client stations and four printers. FIG. 4 shows the layout of an exemplary office suite 400 wherein each of the client stations can be analogized to the computer of a cubicle or office of employees working within that office suite. The office suite 400 has four printers: a color laser printer 410, a high-end desktop laser printer 412, a color ink jet printer 414 and a low-end printer 416. Also shown in FIG. 4 are five client stations—client station A 420, client station B 422, client station C 424, client station D 426 and client station E 428. A server 460 is connected by use of network 450 to the five client stations and the four printers contained within the office suite 400.

Color laser printer 410 is capable of printing laser-quality color images in high resolution with the average color laser printer able to print up to six pages per minute (ppm). High-end desktop laser printer 412, on the other hand, is, in the example, only capable of printing a black-and-white image, or in the case of graphics, a gray-scale image, but at a high rate of speed such as 16 ppm. For example, the industry considers currently the Hewlett-Packard 5 si (a product of Hewlett-Packard Corp.) laser printer to be a high-end desktop laser printer which has a capability of printing 24 ppm in black-and-white with between 600 dpi and 1200 dpi as the resolution/quality of the print image.

Color ink jet printer 414 is, in the example, a low-end color printer using ink jet technology and is meant primarily for the home user or the small office but is also common where, while color capability is required, high-end color such as laser color is not required. An example of a color ink jet printer such as color ink jet printer 414, is the Hewlett-Packard 660C color ink jet printer (a product of Hewlett-Packard Corp.), which can print at a resolution of 300 dpi in color, but also can print at a resolution of 600 dpi in black-and-white in its highest quality mode. Further, such ink jet printers have the capability of handling a great variety of paper and media such as transparencies, labels and envelopes in contrast to most laser printers which are limited in the media they can print on. Finally, the exemplary office suite 400 also has a low-end laser printer 416 which in the example are laser printers capable of printing around 12 or fewer ppm in black-and-white. An example of such a low-end laser printer as low-end laser printer 416 is the Hewlett-Packard 5ML (a product of Hewlett-Packard Corp.) series of printers.

The printers 410, 412, 414 and 416 shown in exemplary office suite 400 may be capable of supporting different printer "languages" such as Postscript or Printer Control Language "PCL" which are control signal protocols informing the printer of where to align its margins, when to perform line feeds or page breaks, what fonts to use, landscape or portrait and so on. Further, since some printers are capable of understanding one of the printer languages such as either Postscript or PCL but not both, a further print job preference may be the printer language which the software/application generating the print job used.

In such a networked printing environment, the software/drivers required for a client station to generate a print job compatible with a new printer may be distributed by the server. The server 460, once loaded with the appropriate updated or new software/drivers, can distribute to each of the client stations a copy of the software/drivers and perform self-installation on those client stations. With this capability of the server, the client station need not be manually updated with drivers/software to account for the presence of a new printer on the network. Thus, the server can automatically account for the presence of a printer newly installed by distributing the software/drivers to client stations and thereby impart instant compatibility with the new printer. Further, where the software/drivers themselves are the subject of upgrade, the server is capable of ensuring that all client stations automatically are equipped with the latest such software.

The printers shown in office suite 400 are all networked printers rather than direct-connect printers. A direct-connect printer is not capable of connecting over a network connection such as Ethernet and can only be connected directly to a port of a computer system. A networked printer has the capability of being both directly connected to a particular computer and connected over network 450. Each of the client stations 420, 422, 424, 426 and 428 are capable of running applications or software which can generate print jobs from documents that the client stations produce or import. In another embodiment of the invention, server 460 may simply be a server which queries information regularly from all of the printers available and keeps a mapping of the geographical location of the printers rather than acting to spool print jobs and determining the appropriate printer to send the print job to.

Figure 6:
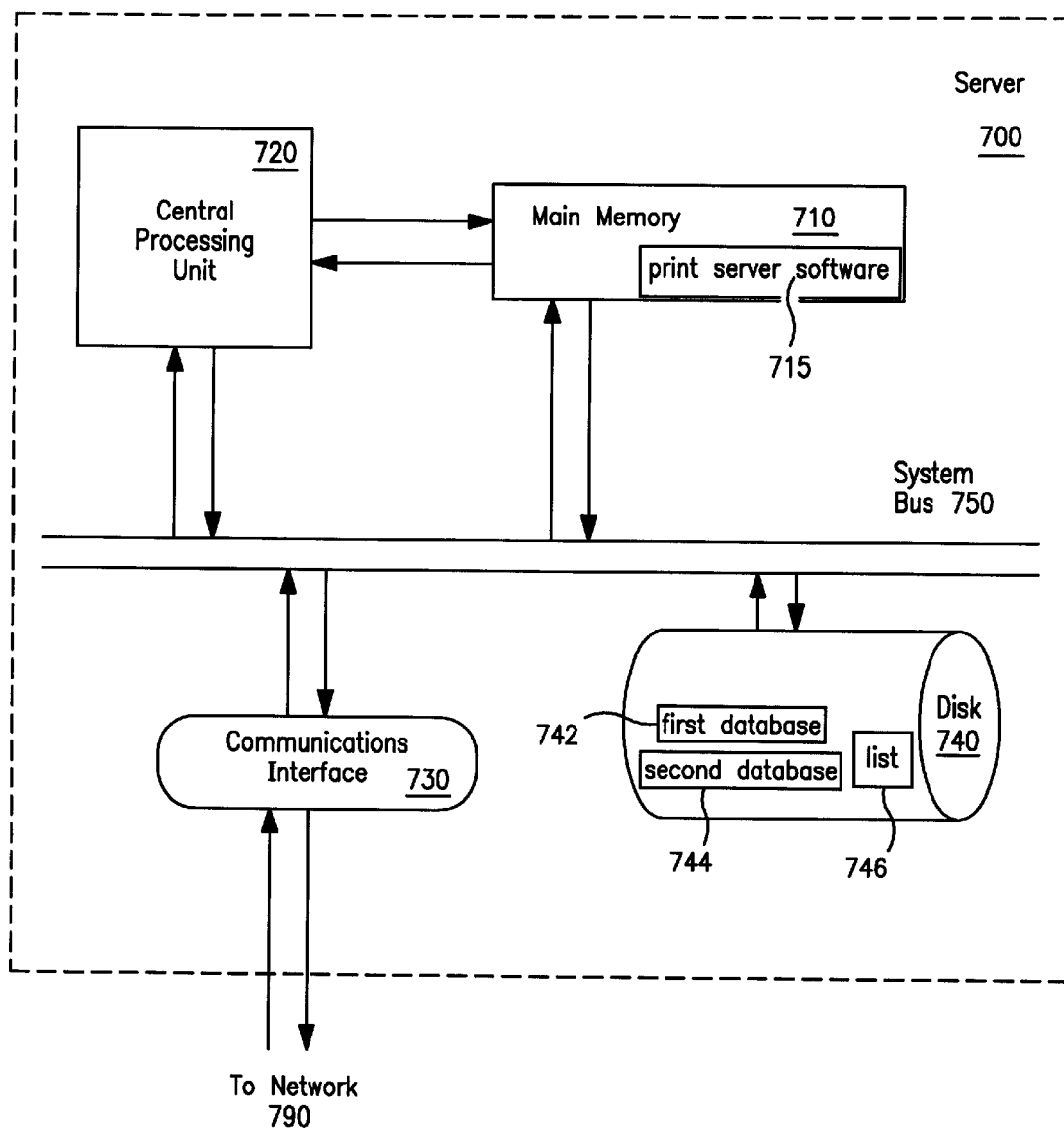
FIG. 6 illustrates a print server in accordance with the various embodiments of the invention.

In such an embodiment, client station A 420, client station B 422, client station C 424, client station D 426 and client station E 428 all include, a virtual printer mechanism which appears and acts like an actual printer to software and applications, but is in fact a printer daemon which can query and determine the most appropriate printer for a particular print job (see description associated with FIG. 6). The virtual printer will query the server and receive status and/or mapping location information from the server for all of the printers in the office suite 400 such that the virtual printer can match the preferences provided to it with the capabilities as well as physical location of printers to find the most appropriate printer for the print job. The virtual printer can be invoked by the user submitting a print command from the application generating the print job or from the operating system. The virtual printer, when invoked, will bring up a menu or GUI dialogue allowing the user to select the preferences of the print job such as speed and quality before the print job is actually processed.

In another example, a user on client station A 420 generates a print job using application or software which runs on client station A 420. When a print command is invoked from the application/software which generated the print job, through use of the operating system, on client station A 420, the virtual printer brings up a dialogue or menu checking for the user's preferences. A menu or dialogue box (described below) will appear allowing the user to select between speed and quality and color or black-and-white. If the user chooses a single preference that the print job be printed in the fastest possible manner because of the great number of pages involved in the print job, then the virtual printer will send speed as a primary preference to the server 460 such that it can determine that the highest speed printer available is the high-end desktop laser printer 412. Since quality is not an issue in this particular example, color laser 410 will not be selected by the server 460 as the appropriate printer since its page per minute capability is only around six ppm and not as fast as high-end desktop laser printer 412. Once the server 460 determines that the high-end desktop laser printer 412 is available, then the server 460 forwards the print job from the virtual server over the network 450 to be processed on high-end desktop laser printer 412. If high-end desktop laser printer 412 is full of paper and not busy, then the print job will be processed on high-end desktop laser printer 412.

Once the print job is completed on high-end desktop laser printer 412, high-end desktop laser printer 412 will send a control signal back to the server which forwards it to client station A 420, or in the alternative, high-end desktop laser printer 412 bypasses the server informing it that the job is completed. The virtual printer then displays a message using the same GUI as the preferences menu (or different GUI) notifying the user of client station A 420 that the print job has been completed and of the physical location of high-end desktop laser printer 412 such that the user may go pick up the print job. If however, after submitting the print job by the server, the high-end desktop laser printer 412 was out of paper and returned an error message to server 460 informing it that it is out of paper, then the server 460 would again query the database and re-compute to determine the next available highest speed printer connected to network 450. Since quality is not a preference of the user, a black-and-white image is assumed and since low-end laser printer 416 has a greater ppm capability than either the color ink jet printer 414 or the color laser printer 410, which are both capable of black-and-white but at lower speed, the server 460 will select low-end laser printer 416 as its next choice of appropriate printer.

If low-end laser printer 416 is available and not busy, the print job will be respooled to low-end laser printer 416 without requiring any action/prompting from the user of client station A 420. Likewise, if high-end desktop laser printer 412, upon initially receiving a request from the server to process the print job, is processing a print job from, for example, client station D 426, then a busy signal is returned by the high-end desktop laser printer 412 over network 450 to server 460 causing the server to automatically select another printer. Further, in the circumstance where high-end desktop laser printer 412 returns a busy signal to client station A 420 through server 460, the user may be presented with a further dialogue box notifying him that high-end desktop laser printer 412 is busy and asking the user whether or not to wait for his print job to be completed at that printer or, in the alternative, to have the server automatically select another appropriate printer instead.

In a second example, assuming that speed is not a primary preference of the print job, then the dialogue box for client station A 420 will also contain a range of image qualities which the user may select as preferred. If the user prefers a detailed graphical image then the next question will be whether that image will be in black-and-white (or grayscale) or in color. If a high quality color image is required, then the server would determine that color laser printer 410 is the most appropriate printer in terms of quality for the job. In case the color laser printer 410 has an error or is busy and the user must settle for less image quality, the next selection by the server 460 would be color ink jet printer 414, which while not having the resolution of color laser printer 410, may have the capability to print at a faster rate and also have the capability, unlike color laser printer 410, to utilize a different paper type, such as a transparency used in an overhead projector. Thus, another print job preference which the user may select is the paper type. For certain paper types, laser printers may be wholly inappropriate whereas ink jet printers, though perhaps slower than black-and-white lasers and with less detailed resolution than color lasers, are still most appropriate because of the medium on which the print job is to be processed.

Server 460 will, according to one embodiment of the invention, also store/generate a coordinate map list of the physical locations of all printers in the office suite 400 as well as the physical locations of each of the client stations A through E. Thus, in the case of two printers complying with the preferences, the printer nearest in physical location to the user at his client station can be selected. The coordinate mapping may utilize a corner of the office as an origin and grid the entire office so that each station or printer has unique coordinates. Further, the locations of user stations and/or printers can be dynamically determined based on their port to which they are connected or routed over the network.

Using a port or connection determined mapping, the changes in physical location of printers and client workstations can be more easily tracked. Thus, if a user at client station E 428 submits a print job requesting merely a color image without regard to its specific quality, then either color laser printer 410 or color ink jet printer 414 may fit this preference. However, by using the location mapping on a database stored in server 460, the server may compute, based on the distance of client station E 428 relative to color laser printer 410 and color ink jet printer 414, that color ink jet printer 414 is closest in physical location to client station E 428. Therefore, the server, upon determining that color ink jet printer 414 is in fact the closest printer, will select color ink jet printer 414 as the appropriate printer and send the job to color ink jet printer 414 for processing. Upon completion of the job, the user at client station E 428 will discover (by notification) that his print job was successfully completed in a location close to him such that the user does not have to travel far to pick up his print job.

In traditional print servers lacking this capability, the user at client station E 428 must select which printer the print job is sent to and to get a close printer, must know its relative location. If the user at client station E 428 is unaware of the distance at which color laser printer 410 is located and the fact that color ink jet printer 414 is also capable of producing the print image for the job that he has sent, then the user at client station E 428 may unwittingly select the color laser printer 410 which is farther in location. Thus, with the print server of this invention, the user does not need to know or determine where the printers are located, what their capabilities are, or which one is busy or does not have an error and can successfully complete the print job—the user is relieved of all such burdens.

Figure 5:
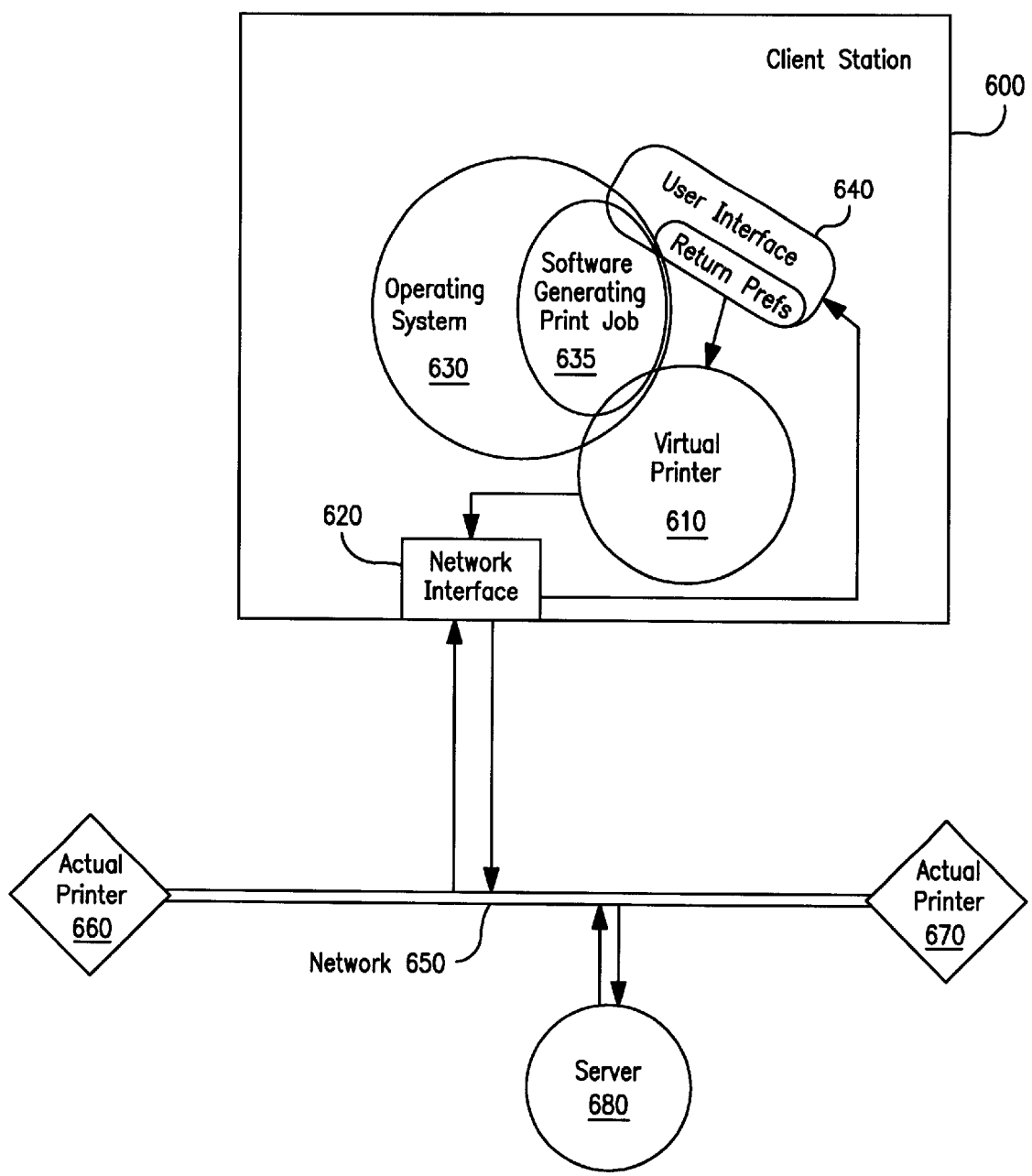
FIG. 5 is a logical diagram of the components of one embodiment of the invention.

FIG. 5 is a logical diagram of components of an embodiment of the present invention.

A client workstation 600 (referred to as "client station" above) is a computer system or other electronic device capable of producing printed output such as a network computer. An operating system 630 is the underlying platform which runs the software and can, in some cases, manage hardware within the system and peripherals connected to the system. The software is software generating a print job 635 such as Microsoft Word™ (a product of Microsoft Corp.) which produces a document such as a letter or report that the user wants printed. The software 635 runs under the operating system 630 and receives data from the operating system in connection with a virtual printer 610 so that the virtual printer 610 is transparent to software 635. Virtual printer 610 is a virtual device recognized by the operating system to be the printer device, but is in fact, only a print daemon which interfaces with a server 680 through network 650 using network interface 620. Virtual printer 610 is software, hardware, firmware or a combination thereof which is pre-programmed to communicate with operating system 630, software 635, actual printers 660 and 670 as well as server 680 running on network 650.

As mentioned earlier, network 650 may be a LAN, WAN, wireless network or the network of networks referred to as the Internet. As shown in FIG. 5, the virtual printer 610 can be part of or a separate function call invoked from operating system 630 and invoked/communicating to software 635 which generates the print job. Virtual printer 610 also interfaces with server 680 receiving error signals forwarding print jobs and preferences and receiving notifications of completed print jobs. A user interface 640 can be a function of the operating system 630 or software 635 which "pops-up" on a display or other output device allowing the user of client station 600 to select the print job preferences.

The software 635 running under operating system 630 generates a print job. When the user of client station 600 activates the print command from software 635, the operating system 630 and/or the software 635 will generate the user interface 640 so that the user can select the preferences of the print job such as quality and speed. The user interface 640 returns preferences to virtual printer 610 which forwards them to server 680 once the user has selected them. Virtual printer 610 communicates with server 680 over network 650 using network interface 620, which is a modem and/or interconnect combined with communicating software or protocol managers. Server 680 matches the print job preferences sent it with profiles of printers or computes a ranking of printers according to their capabilities as indexed in a database to determine which of the actual printers on the network is the appropriate printer for the print job. The server 680 may also, preferably, receive the print job itself in a spooling operation from the client station 600 through virtual printer 610 to relieve the system resources of client station 600 for other tasks. Server 680 may also contain a coordinate or other locational mapping of the actual printers 660 and 670 and client stations in the network using the formulas outlined above, the server 680 computes the distances of the actual printers 660 and 670 to the client station to determine which are closest to the client station, and thus which printer is the most appropriate.

Once server 680 has found an appropriate printer, server 680 sends the print job to that printer. If the print job is printed successfully, a signal will be returned over network 650 by that printer indicating which printer the job was printed on to server 680. Server 680 can then forward the notification to virtual printer 610. Virtual printer 610, through use of user interface 640 or a new user interface notifies the user of the location of the print job using a mapping result sent from server 680 along with successful print job notification.

If, however, an error signal indicating a busy printer is received, then the server will forward the error signal to virtual printer 610 and, acting through operating system 630 and/or software 635, the virtual printer 610 will invoke another user interface or use the user interface 640 to allow the user the choice of waiting or asking the server to select an available printer that is not busy. If the user wants the job printed immediately and does not want to wait for the selected appropriate printer to finish its previous job, server 680 will once again query the database, or the pre-computed ranking of printers and determine another appropriate printer.

Rather than a busy signal, if the printer returns an error signal such as "out of paper", the server will select another appropriate printer and re-send the job without any prompting from the user.

In another embodiment, the virtual printer 610 does not forward the print job and the user's preferences to server 680. The virtual printer 610 instead performs all the computation and logic to find the most appropriate printer for the job and interacts with server 680 only to access the databases of printer availability, capability and location. In such an embodiment, all of the logic, computing and ranking required to select a printer most appropriate for printing the print job is performed by the virtual printer rather than the server. Once virtual printer 610 has determined the appropriate printer, the print job may be spooled to server 680 and then to that printer or directly spooled from the client station to that printer. When the print job is complete, the selected printer informs the user of client station 600 through network 650, network interface 620, user interface 640 and virtual printer 610.

FIG. 6 illustrates a print server in accordance with the various embodiments of the invention.

The server 700 may be any computer system, whether desktop or mainframe, such as the Sun Sparc™ (a product of Sun Microsystems, Inc.) family of systems, but is preferably a computer system capable of handling whatever volume of print traffic is generated for the printers and client workstations which the server is responsible for. The server can have as its operating system any network-based operating system such as Solaris (a product of Sun Microsystems, Inc.) (not shown). Though server 700 may have many components, an exemplary and sufficient set of components is shown in FIG. 6.

At the heart of server 700 is a Central Processing Unit (CPU) 720, which may be for example a Sparc processor from Sun Microsystems. CPU 720 is capable of executing and issuing instructions, performing computations and processing data. CPU 720 is coupled directly to and communicates with Main Memory 710, which may be a Random Access Memory (RAM) or even Read-Only Memory (ROM). Both CPU 720 and main memory 710 are coupled directly to and communicate over a system bus 750 (such as the S-Bus of Sun Microsystems) to other components in the system. Main memory 710 is capable of loading, storing and reading stored information such as data or instructions of programs that are to be executed.

Other devices coupled to system bus 750 include a disk 740 and a communications interface 730. Disk 740 is a permanent storage medium and unlike main memory 710, does not lose the information it stores when not powered by a power source. Thus, disk 740 is a magnetic storage medium such as floppy, tape, optical and hard disk drives. Communications interface 730 may be any components capable of communicating over a network, such as, for example, an Ethernet network interface card, or a modem and its associated lines. Communications interface 730 is capable of sending and receiving data from server 700 to a network 790. Network 790 may connect together several different shared printers as well as client workstations such that server 700 can maintain communications between any of these devices.

The server 700 may operate as a print server, whether dedicated to that task or also performing other tasks, in the following manner:

The primary functions of the print server are carried out through the use of print server software 715. Print server software 715 contains the code and instructions to perform all the print server tasks such as determining the appropriate printer, and may be loaded into main memory 710, as shown in FIG. 6. CPU 720 runs the instructions stored in the part of main memory 710 containing the print software 715, and can write any results of executing those instructions back to main memory 710. Print server software may be copied, initially, upon boot-up of the server or upon invocation of the software, from disk 740 where it may be stored in binary (executable) form into main memory 710. After being copied to main memory 710, print server software will be "resident" in memory so that it may perform print server functions upon demand on a print job sent to server 700 over network 790. Disk 740 is shown as containing two databases, a first database 742 and a second database 744, as well as a generated list 746.

In one embodiment, first database 742 stores the capabilities of all the printers running on the network. For example, the four printers shown in the office suite of FIG. 4, color laser printer 410, high-end desktop laser printer 412, color ink jet printer 414 and low-end printer 416, may each be identified by some designator such as P1, P2, P3 and P4, respectively. First database 742 may store a matrix, indexed by the printer designator, of printer capabilities such as dots-per-inch (dpi) resolution, pages-per-minute (ppm) speed and modes (color, black-and-white, etc.). Thus, a matrix of first database 742 storing the capabilities described above for the printers of the office suite shown in FIG. 4 may look like:

TABLE 1

| ID | Mode 1 | Res. 1 | Speed 1 | Mode 2 | Res. 2 | Speed 2 |
|----|--------|--------|---------|--------|--------|---------|
| P1 | BW | 600 dpi | 12 ppm | CO | 600 dpi | 6 ppm |
| P2 | BW | 1200 dpi | 24 ppm | CO | 0 | 0 |
| P3 | BW | 600 dpi | 4 ppm | CO | 300 dpi | 2 ppm |
| P4 | BW | 600 dpi | 12 ppm | CO | 0 | 0 |

Mode 1 is identified by a BW, indicating that the speed and resolution, "Res. 1" and "Speed 1" which are the next two entries, correspond to the printer operating in a black-and-white mode (BW). Likewise, the color Mode 2, which is designated as "CO" also has speed and resolution settings after it. Where a color mode is not available, such as in high-end desktop laser printer 412, the speed and resolution are both given zero values to so indicate. Using this database, a field may be added for the status of the printer, whether busy, in a state of error or available. Further, the list shown in Table 1 may be combined with linked lists for each printer storing the size, user, etc. of multiple print jobs which a printer may have been selected to process. Each of the entries for the table is read, and then according the print job's preferences, is sorted into a list 746. Mode 1, may in the alternative, be the highest quality mode that the associated printer is capable of operating in.

A second database 744 is also shown which may contain the geographical mapping of the printers and client stations connected over network 790. Second database 744 will have a table similar to that of Table 1, but storing in coordinate fashion the location of each printer and client station.

In operation, a print job along with its preferences is received by communications interface 730 and travels over system bus 750 to either be stored in main memory 710 or in disk 740 to be accessed by software 715. Print server software 715 then sorts the entries of printer capabilities according to the preferences. The sorted entries are stored in list 746, rather than upsetting the order of the database 742 which may already be placed in a high-quality to low-quality order.

Also, print server software 715 can query the second database 744 using as a key or index the IDs of the first two/three printers in list 746 to obtain their coordinates. Also, the print job, identified by some header accompanying the job, indicates which client station the job originated from. The client station ID is used as a key to access the coordinates of that client station. Then the formula $\sqrt{(X_2-X_1)^2+(Y_2-Y_1)^2}$, where $(x_1, y_1)$ is the client station and $(x_2, Y_2)$ is the coordinates of the printer (assuming a single plane), is computed by the print server software accessing CPU 720 to perform its calculations, storing temporary results in a list like list 746, or in main memory 710. Then, print server software 715, depending upon the priority given to printer distance/location from the client station, can re-order list 746 such that the top entry is the closest printer which is also capable of processing the print job according to the preferences. The top most entry is then selected as the "appropriate" printer for the print job.

The print job, which may have been spooled to disk 740 upon receipt, is then relayed through system bus 750 to be sent to the appropriate printer on network 790 using communications interface 730. If the appropriate printer is busy, then, the print server software 715 queries the user at the client station on network 790 from which the job originated whether or not the user wants to wait. If not, the print server software will take the next entry from list 746 as the new appropriate printer and re-send the print job. If the user wants to wait, because of the printer's location or capability, then the job will be sent when a not-busy acknowledgment or ready (available) acknowledgment is received from that printer. When querying the user, the user may also be notified of where the next printer (location/distance) and what its capabilities are which is to be selected so that the user makes an informed choice. The user is prevented from having to select the printer himself, that function is already performed by the server.

If the selected appropriate printer has an error, indicated by the printer returning to the server or broadcasting an error signal, such as "printer out-of-paper," then the print server software will select the next printer in the list as the new appropriate printer for the job. If the selected printer is available and has no error, then the print job is processed. Upon completion, the printer acknowledges that the print job has been processed by sending a signal back to server or, in the alternative, directly back to the client station on which the job originated.

Using disk 740, the server is able to store and periodically update the status of print jobs and of client station activity. Further, printer errors can relayed to computer administrators or other personnel responsible for the upkeep of the printers so that the error can be cleared. Further, the list 746 (and others similar to it) can be pre-generated before the arrival of a print job so that list 746 lists in order, the highest quality printer to the lowest quality printer, so that the amount of computation required over many print jobs can be reduced.

Many alternate embodiments of the present invention are possible, depending upon the needs and requirements of the machine to be administered, and the embodiment described above is merely an embodiment.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In a network having a client that generates a print jobs, a printing system comprising:
    a server coupled to said network and said client, said server configured to maintain a database of printer capabilities, said server configured to receive preferences of said print job;
    a first printer coupled to said server, said server determining that said first printer complies with said preferences by accessing said database, said server automatically forwarding a print job to said first printer; and
    a second printer coupled to said server, wherein when said server receives a signal from said first printer indicating that said print job cannot be completed, said server terminating said print job on said first printer, said server determining that said second printer complies with a portion of said preferences, said server automatically forwarding said print job to said second printer.

2. A printing system according to claim 1, wherein said signal includes error signals.

3. A printing system according to claim 1, wherein said database is further configured to include status of printing conditions after said print job has been forwarded.

4. A printing system according to claim 1, further comprising said server determining that said second printer complies with a portion of said preferences and forwarding said print job to said second printer.

5. A printing system according to claim 1, further comprising said server determining that said second printer complies with a portion of said preferences and forwarding said print job to said second printer.

6. A printing system according to claim 1 further comprising a database coupled to said server cataloging the location of printers and said client on said network.

7. A printing system according to claim 1 wherein said server is configured to receive said print job and is coupled to said network to forward said print job for processing upon determining that a printer complies with said preferences and has an available status.

8. A printing system according to claim 1 wherein said preferences include print image quality and speed of said print job.

9. A printing system according to claim 7 wherein said preferences include the distance from and location of said first printer in relation to said client.

10. A printing system according to claim 1 wherein said preferences include color images and black-and-white images of said print job.

11. A printing system according to claim 1 wherein said signal includes a printer busy signal.

12. A printing system according to claim 11 further comprising a dialog coupled to said client to enable a user to select continuing processing of said print job on the first printer upon said printer busy signal being cleared rather than processing of said print job on the second printer.

13. A printing system according to claim 1 wherein said signal includes an out-of-paper signal.

14. A printing system according to claim 1 wherein said printing system further comprises a virtual printer coupled to said client, said virtual printer configured to route said print job and said preferences to said server.

15. On a network, a print server having a system bus, main memory and CPU, said server connecting printers and clients on said network, said server comprising:
    a communications interface coupled to said bus, said interface coupled to receive a plurality of print jobs and their preferences and to receive printer signals over said network, said interface configured to transfer said print jobs, said preferences and said signals to said server;

a disk coupled to said bus configured to store databases related to said printers; and a printer server software executed by said CPU and coupled to said main memory, said printer server software automatically selecting a first printer by matching said preferences against said databases, said databases further including the status of actual printing conditions after a print job has been forwarded to a second printer, wherein when said server receives a printer signal from said first printer indicating that said print job cannot be completed, said server terminating said print job on said first printer, said server determining that a second printer complies with said preferences, said server automatically forwarding said print job to said second printer.

16. A server according to claim 15 further comprising a database stored and updated on said server, said database configured to catalog the capabilities of printers connected to said network.

17. A server according to claim 15 further comprising a database stored and updated on said server, said database configured to catalog the status of printers connected to said network.

18. A server according to claim 15 further comprising a database stored and updated on said server, said database configured to maintain a location mapping of printers connected to said network.

19. A server according to claim 15 wherein said preferences include print image quality and speed of said print job.

20. A server according to claim 15 wherein said preferences include the distance and location of one of the first printer and the second printer in relation to said client generating said print job.

21. A server according to claim 15 wherein said signal includes a printer busy signal.

22. A server according to claim 15 wherein said signal includes an out-of-paper signal.

23. A server according to claim 21 wherein a dialog is coupled to each said client to enable a user to select continuing processing of said print job on said first printer upon said printer busy signal being cleared rather than processing of said print job on a printer other than said first printer.

24. In a network connecting a plurality of clients, said clients generating print jobs, a printing system comprising:

a server coupled to said network and to said clients, said server maintaining a database of printer capabilities and the status of printing conditions for print jobs forwarded to printers on said network;

a virtual printer coupled to each client, said virtual printer receiving preferences of a print job generated by the client to which the virtual printer is coupled, said virtual printer coupled to said server; and a first printer coupled to said network and to said server, said virtual printer determining that said first printer complies with said preferences using information from said database, said virtual printer automatically forwarding said print job to said first printer, wherein when said virtual printer receives a signal from said first printer indicating that said print job cannot be completed, said virtual printer terminating said print job on said first printer, said virtual printer determining that a second printer complies with said preferences, said virtual printer automatically forwarding said print job to said second printer.

25. A printing system according to claim 24, further comprising said virtual printer determining that said second printer complies with a portion of said preferences and forwarding said print job to said printer.

* * * * *